(12) United States Patent
Facciano et al.

(10) Patent No.: US 7,980,057 B2
(45) Date of Patent: Jul. 19, 2011

(54) INTEGRAL COMPOSITE ROCKET MOTOR DOME/NOZZLE STRUCTURE

(75) Inventors: Andrew B. Facciano, Tucson, AZ (US); Robert T. Moore, Tucson, AZ (US); Kelly J. Sinnock, Cedar Rapids, IA (US); Scott T. Caldwell, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 860 days.

(21) Appl. No.: 11/986,954

(22) Filed: Nov. 27, 2007

(65) Prior Publication Data

US 2008/0290191 A1    Nov. 27, 2008

Related U.S. Application Data

(60) Provisional application No. 60/931,091, filed on May 21, 2007.

(51) Int. Cl.
*F02G 1/00* (2006.01)
*F02G 3/00* (2006.01)
*F02K 9/68* (2006.01)

(52) U.S. Cl. ............. 60/200.1; 60/253; 60/255; 60/770; 239/265.11

(58) Field of Classification Search .................. 60/200.1, 60/253, 255, 770; 239/265.11
See application file for complete search history.

(56) References Cited

U.S. PATENT DOCUMENTS

| 3,537,646 A * | 11/1970 | Emerson ................. 239/265.15 |
| 4,649,701 A | 3/1987 | Wendel |
| 4,767,656 A | 8/1988 | Chee et al. |
| 6,013,361 A * | 1/2000 | Seal et al. .................. 428/297.4 |
| 6,308,408 B1 * | 10/2001 | Myers et al. ................ 29/890.01 |
| 6,638,883 B2 | 10/2003 | Gaffney et al. |
| 6,676,080 B2 * | 1/2004 | Violette ...................... 244/123.1 |
| 6,935,594 B1 | 8/2005 | Vaidyanathan et al. |
| 2001/0017183 A1 | 8/2001 | Cornelius et al. |
| 2003/0096894 A1 * | 5/2003 | Metcalf et al. ................. 524/238 |

FOREIGN PATENT DOCUMENTS

| WO | WO-2009032026 A1 | 3/2009 |
| WO | WO-2009032026 A4 | 3/2009 |

OTHER PUBLICATIONS

"International Application Serial No. PCT/US2008/006508, International Search Report and Written Opinion mailed Jan. 26, 2009", 10 pgs.

* cited by examiner

*Primary Examiner* — Michael Cuff
*Assistant Examiner* — Craig Kim
(74) *Attorney, Agent, or Firm* — Schwegman, Lundberg & Woessner, P.A.

(57) ABSTRACT

An integral composite rocket motor nozzle. The novel nozzle includes a first layer of a first reinforcement material, a second layer of a second reinforcement material, and a common matrix material surrounding the first and second reinforcement materials such that the reinforcement materials and matrix material form a single integral composite structure. In an illustrative embodiment, the first reinforcement material includes graphite fibers for providing structural support, and the second reinforcement material includes glass or quartz fibers for providing thermal insulation on a first side of the first layer. The nozzle may also include a third layer of a third reinforcement material for providing thermal insulation on a second side of the first layer. In a preferred embodiment, the first layer is shaped to form an integrated dome and nozzle structure.

18 Claims, 3 Drawing Sheets

INTEGRAL COMPOSITE ROCKET MOTOR DOME/NOZZLE STRUCTURE

REFERENCE TO COPENDING APPLICATIONS

This application claims the benefit of U.S. Provisional Application No. 60/931,091, filed May 21, 2007, the disclosure of which is hereby incorporated by reference.

BACKGROUND OF THE INVENTION

1. Field of the Invention

The present invention relates to missiles and rocket motors. More specifically, the present invention relates to rocket motor nozzles.

2. Description of the Related Art

Rocket motors typically create thrust by expelling a high-temperature exhaust produced by the combustion of solid or liquid propellants through a nozzle. The hot gas (or liquid or plasma) exhaust exits from the combustion chamber through a narrow opening (or "throat") into the nozzle. The nozzle is shaped such that it causes the gas to expand and accelerate, converting the thermal energy into kinetic energy. As the gas expands, it exerts pressure against the walls of the nozzle, forcing the missile in one direction while the gas accelerates in the opposite direction.

Missile propulsion airframe technologies today typically rely on separate metallic reinforced dome and nozzle assemblies fabricated with numerous special use laminates for thermal protection, primary airframe, and subcomponent assembly capabilities. A typical dome/nozzle assembly includes a structural shell for providing structural support usually made from a metal such as aluminum or steel, plus several layers of insulation. Exhaust plume temperatures can reach up to about 5000° F., which is much higher than the melting point of the materials traditionally used to form the structural shell of the dome/nozzle assembly. In order to prevent the dome and nozzle from melting, the metal shell is typically protected by one or more layers of high melting point insulation materials—such as silica, glass, or carbon phenolics—and/or ablative materials designed to erode in a controlled manner.

The nozzle throat area, which is subject to the highest temperature loads, typically includes an insulation layer made from a very high melting point material such as carbon-carbon. Carbon-carbon, however, has a very low thermal coefficient of expansion (TCE) while the metal shell has a very high TCE. The carbon-carbon insulation therefore cannot be bonded directly to the steel shell, since the large TCE differential could cause the bond to break when heated. Several layers of materials having different TCEs are therefore typically placed between the insulation and the steel shell to gradually increase the TCE.

These multiple insulation layers, however, result in multiple bond joints that may come apart when subject to extreme heat loads. This can become a problem particularly for pulsed rocket motors. A pulsed rocket motor includes multiple segments of propellant separated by a barrier. Each segment is ignited separately, with periods between segments in which no propellant is burned (during which the missile coasts). Pulsed rocket motors can offer increased range and efficiency, but typically create increased thermal stresses on the rocket motor nozzle. After a propellant segment is burned through, the heat from the exhaust diffuses through the multiple layers of the dome/nozzle assembly, weakening the bond joints. In a conventional non-pulsed motor, this is usually acceptable because the nozzle is no longer needed; the nozzle only needs to remain intact during the single burn period. In a pulsed motor, however, the dome/nozzle assembly must maintain structural integrity through one or more additional burn periods. This can be very difficult to achieve with conventional dome/nozzle designs.

In addition, the multiple laminate interfaces with differing materials found in traditional rocket motor aft bodies require thick bond joints, o-rings, gaskets, and seals to achieve a thermal shock capability during propulsion ignition and burn, all involving significant manual labor, structural weight, assembly cost and complexity.

Hence, a need exists in the art for an improved rocket motor nozzle that offers improved thermal performance, less structural weight, and lower fabrication cost than prior approaches.

SUMMARY OF THE INVENTION

The need in the art is addressed by the integral composite rocket motor nozzle of the present invention. The novel nozzle includes a first layer of a first reinforcement material, a second layer of a second reinforcement material, and a common matrix material surrounding the first and second reinforcement materials such that the reinforcement materials and matrix material form a single integral composite structure. In an illustrative embodiment, the first reinforcement material includes graphite fibers for providing structural support, and the second reinforcement material includes glass or quartz fibers for providing thermal insulation on a first side of the first layer. The nozzle may also include a third layer of a third reinforcement material such as glass fibers for providing thermal insulation on a second side of the first layer. In a preferred embodiment, the first layer is shaped to form an integrated dome and nozzle structure, and the common matrix material is a high temperature resin such as bismaleimide, cyanate ester, or polyimide.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention, would be of significant utility.

Figure 1:
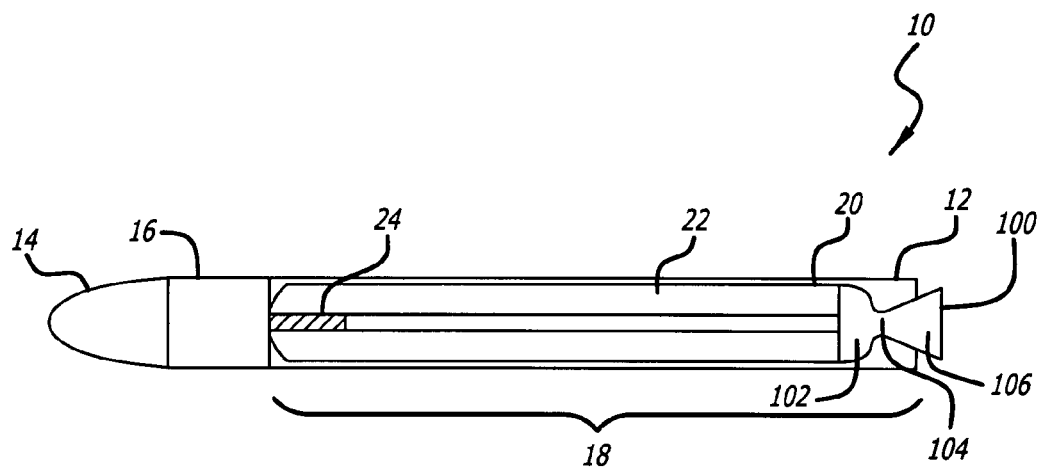
FIG. 1 is a simplified schematic of an illustrative missile with a rocket motor nozzle designed in accordance with an illustrative embodiment of the present invention.

FIG. 1 is a simplified schematic of an illustrative missile 10 with a rocket motor nozzle 100 designed in accordance with an illustrative embodiment of the present invention. The illustrative missile 10 includes a missile body 12, which houses a sensor 14 for locating a target, a guidance system 16 for guiding the missile 10 toward the target, and a rocket motor 18 for providing thrust to increase the range of the missile 10. The rocket motor 18 includes a combustion chamber 20 filled with a propellant 22 that is ignited by an igniter 24 controlled by the guidance system 16.

The rocket motor 18 also includes a novel integrated dome and nozzle structure 100. The dome 102 portion of the dome/nozzle structure forces the exhaust gas produced by the combustion of the propellant 22 to exit the combustion chamber 20 through a narrow throat 104 and out the nozzle 106, which is shaped such that it causes the gas to expand and accelerate, thereby providing thrust for the missile 10. In accordance with the present teachings, the dome and nozzle structure 100 is integrally manufactured with a single high temperature resin system, but with different fibers for airframe continuity, structural strength, and thermal ablation characteristics. In contrast with conventional dome and nozzle assemblies, the dome and nozzle structure 100 of the present invention is a single composite structure capable of performing multiple functions.

Figure 2:
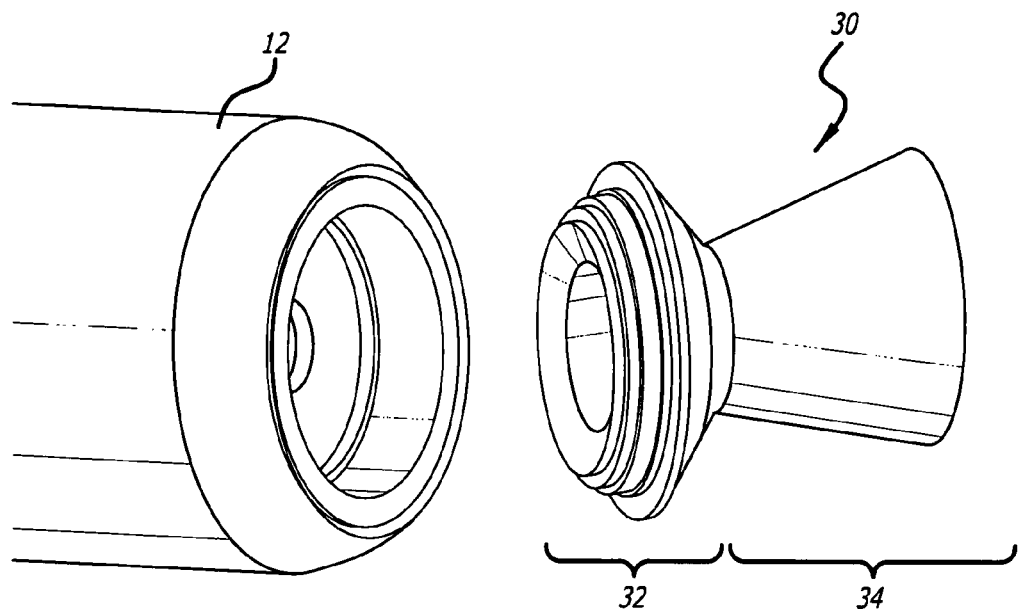
FIG. 2 is three-dimensional view of a conventional dome and nozzle assembly.

FIG. 2 is three-dimensional view of a conventional dome and nozzle assembly 30. A conventional dome and nozzle assembly 30 typically includes a separate dome 32 and nozzle 34. The throat of the nozzle 34 screws into the dome 32, and the dome 32 is fastened to the aft missile casing 12 (which houses the combustion chamber). Conventional domes 32 and nozzles 34 are fabricated from several different types of material that are bonded together, typically including metallic shells for providing structural support and layers of silica, glass, or carbon phenolic for providing insulation. These different types of material must be layered in a manner such that the dome and nozzle assembly can survive the high thermal shocks generated by the exhaust plume.

Figure 3:
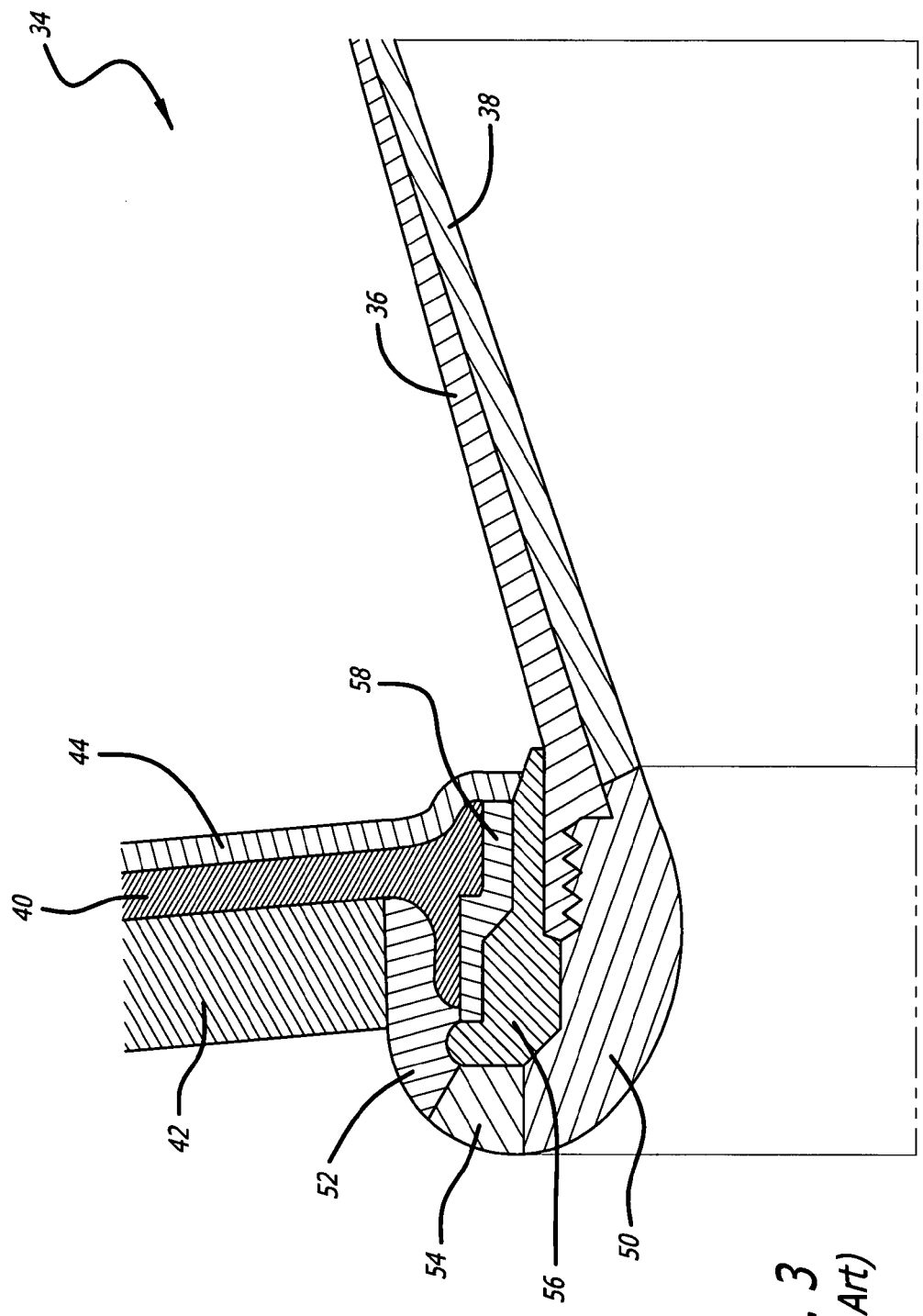
FIG. 3 is a cross-sectional view of a conventional nozzle.

FIG. 3 is a cross-sectional view of a conventional nozzle 34, showing the numerous layers present. As shown, a conventional nozzle 34 usually includes a steel shell 36 and multiple layers of insulation for protecting the metallic shell 36 from the high temperature exhaust (steel provides good structural strength, but has a relatively low melting point). In the example nozzle 34, the interior of the exit cone portion of the nozzle 34 includes a liner 38 made from silica, glass, or carbon phenolic for propellant burn insulation. The dome includes a steel shell 40, interior insulation 42, and exterior insulation 44. The throat area between the dome and nozzle, which is subject to the highest temperature loads, includes an insulation insert 50 made from a very high melting point material such as carbon-carbon (which provides excellent insulation, but has poor structural integrity). Since there is a large difference in TCE between carbon-carbon and steel, the nozzle 34 also includes several layers of material (52, 54, 56, and 58) having intermediate values of TCE between the throat insert 50 and the metal shells 36 and 40, such that the TCE gradually steps up from that of the insert 50 to that of the metal shells 36 and 40. If the TCE differential between neighboring layers is too large, the bonding between the layers may fail, causing the nozzle 34 to fall apart.

Figure 4A:
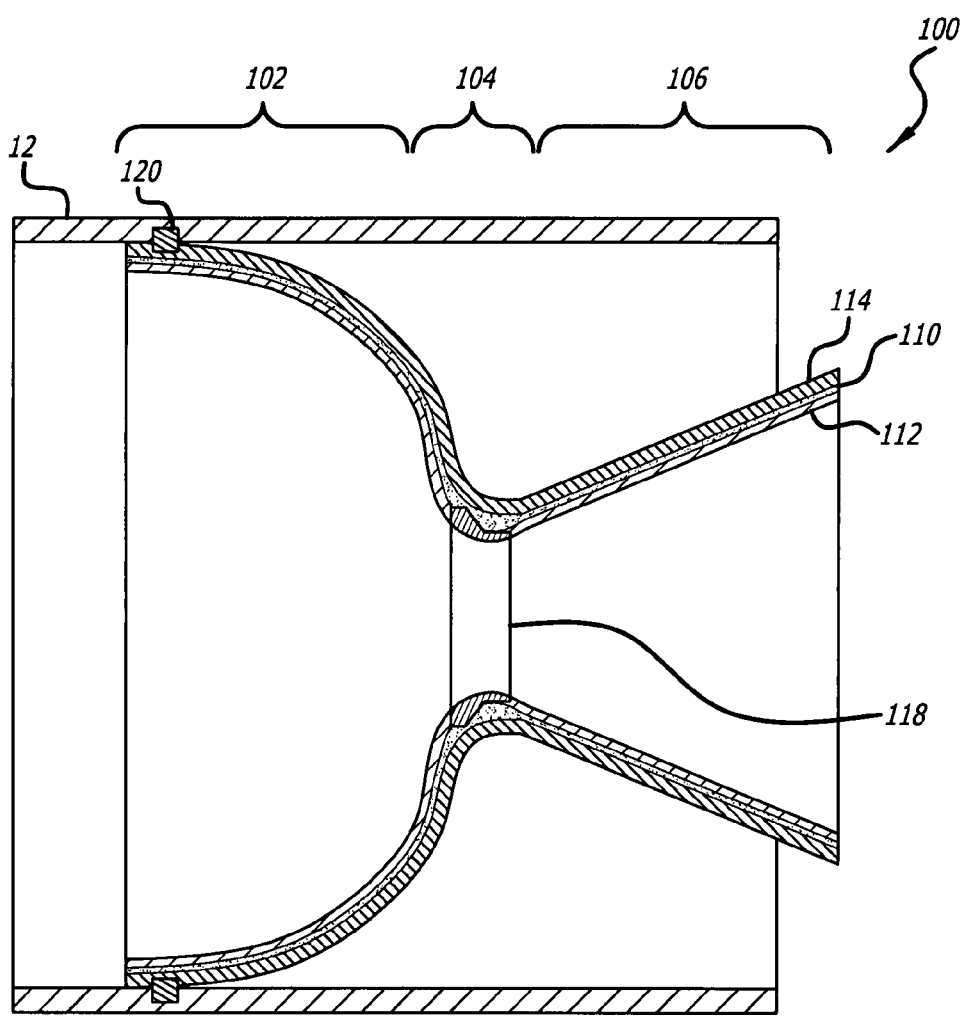
FIG. 4a is a cross-sectional view of an integrated dome and nozzle structure designed in accordance with an illustrative embodiment of the present invention.

FIG. 4a is a cross-sectional view of an integrated dome and nozzle structure 100 designed in accordance with an illustrative embodiment of the present invention. The novel dome and nozzle structure 100 is a single composite component fabricated from layers of different types of fiber (or other reinforcement material) that are co-cured with a common resin (or other matrix material).

Figure 4B:
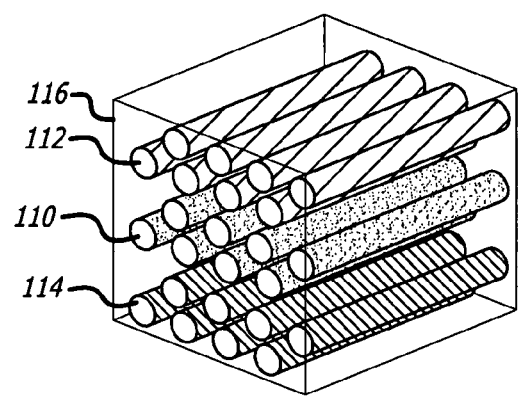
FIG. 4b is a simplified diagram of the different fiber layers of a dome and nozzle structure designed in accordance with an illustrative embodiment of the present invention.

FIG. 4b is a simplified diagram showing a close up of the different fiber layers of the dome and nozzle structure 100. Each fiber layer provides a different function. In the illustrative embodiment, the dome/nozzle structure 100 includes three layers: a first layer of fibers 110 for providing structural strength, a second layer of fibers 112 for providing insulation from propellant burn on the interior of the structure 100, and a third layer of fibers 114 for providing insulation on the exterior of the structure 100 to protect any electronics or other components that may be located near the nozzle 100. A common resin 116 surrounds the fibers 110, 112, and 114, forming a single integral composite structure. In FIG. 4b, the fibers 110, 112, and 114 are shown oriented in a parallel alignment for simplicity. The fibers 110, 112, and 114 may be oriented in different directions without departing from the scope of the present teachings.

In a preferred embodiment, the first layer of fibers 110 forms an integrated dome and nozzle structure, including a dome section 102, throat section 104, and nozzle section 106. The dome section 102 receives the exhaust gas from the combustion chamber and directs it through the throat section 104 and out the nozzle section 106. The present teachings may also be applied to fabricate a separate nozzle or separate dome; however, an integrated dome and nozzle structure should provide better structural robustness as well as decreased cost. In an illustrative embodiment, the first layer 110 is made from graphite fibers, or any other fiber material suitable for providing primary load carrying capabilities.

The second layer 112 is disposed next to the first layer 110, on the interior of the structure 100. In an illustrative embodiment, the inner layer 112 is made from an ablative insulation material such as glass or quartz fibers. The third layer 114 is disposed next to the first layer 110, on the exterior of the structure 100. In an illustrative embodiment, the outer layer 114 is an insulation layer of glass fibers.

All three layers of fibers 110, 112, and 114 are surrounded by the same high temperature resin system 116, which may be, for example, bismaleimide, cyanate ester, polyimide, or phthalonitrile. Once a common resin 116 is used between the three layers 110, 112, and 114, then they can be co-cured as an axial-symmetric shell for greater integration and integrity. Thus, even though the dome and nozzle structure 100 includes different layers 110, 112, and 114 that are providing different capabilities, they are formed into an integral composite structure that has a similar TCE throughout the structure (since they have a common resin) and does not have any bond joints that may break apart due to thermal shock.

A number of industrial fabrication techniques can be used to manufacture a composite dome and nozzle structure 100 designed in accordance with the present teachings, including automated filament winding, tape winding, resin transfer molding, tape placement processes, manual hand placement, and autoclaving. The axial symmetry of the dome/nozzle structure 100 makes it particularly suitable for filament winding, a very inexpensive composite fabrication technique in which prepreg tape (fiber that is pre-impregnated with resin) is wound around an internal mold of the structure. The inner insulation layer 112 is wound first to the desired thickness, followed by the structural layer 110 and the outer insulation layer 114. The resulting structure is then cured to form the integral composite structure. Other fabrication techniques may also be used without departing from the present teachings.

The fiber layers 110, 112, and 114 do not need to be of uniform thickness. It may be desirable to vary the thickness of the layers, for example, increasing the thickness of both the graphite layer 110 and the inner insulation layer 112 in the throat area in order to handle the higher temperature loads in this region.

The dome and nozzle structure 100 may also include an additional throat insert 118 for adding more insulation in the throat area. The throat insert 118 may be co-cured in place with the dome/nozzle structure 100 during fabrication for greater hardware integration and interface compatibility. Alternatively, the throat insert 118 may be secondarily bonded, screwed into the composite structure 100, or held in place by a dual-diameter design as shown in FIG. 4a such that it has a larger diameter in the dome direction, preventing it from slipping out of the throat (since the exhaust flows from the dome toward the nozzle). In the preferred embodiment, the throat insert 118 is made from carbon-carbon coated with a metal, high temperature ceramic, or refractory material. The throat insert 118 should be positioned in contact with the graphite layer 110 for maximum structural support. Because carbon-carbon has a TCE that is almost identical to that of graphite, there is no need to add multiple layers between the throat insert 118 and the structural layer 110.

The dome and nozzle structure 100 may also include some mechanism for attaching the structure 100 to the missile body 12. In the illustrative embodiment of FIG. 4a, the structure 100 includes a key 120, which is a ring that slides around the dome/nozzle structure 100 and through a slot in the missile casing 12, locking the structure 100 in place. Alternatively, the dome and nozzle structure 100 may include threads for screwing the structure 100 into mating threads on the casing 12, or the structure 100 may be fastened to the casing 12 by bolts. Other mechanisms for attaching the dome/nozzle structure 100 to the missile body 12 may also be used.

In the illustrative embodiment of FIG. 4a, the dome and nozzle structure 100 has a simple fixed nozzle design. The present teachings may also be applied to other nozzle designs, such as a submerged nozzle, an extendable nozzle, a movable nozzle, or a nozzle with a blast tube (between the dome and nozzle), without departing from the scope thereof.

Substantial cost savings to missile production may result by integrating the dome with the nozzle and temperature protection systems in accordance with the present teachings. The elimination of secondary processes, consolidation of common features, and integration of fabrication steps simplify production. Redundancy is eliminated, airframe performance is more robust, and fabrication is more economical and efficient, minimizing inspection and logistical requirements for multiple production programs. Advantages over the prior metallic approaches include structural performance improvement and weight reduction as a result of manufacturing simplification and part consolidation utilizing composite material fabrication techniques.

The integral dome/nozzle composite configuration of the present invention may also enable tighter angular assembly tolerances for the rocket motor plume thrust than what is typically found in conventional technologies. This is often a big issue with conventional nozzle and dome assemblies where maintaining angular tolerances can be difficult and expensive due to the multiple hardware manufacture and assembly requirements where numerous physical attachments (e.g., fasteners, threaded interfaces, etc.) and laminated materials that are secondarily bonded are necessary. High angular thrust misalignments typically require aerodynamic trim capabilities from control actuation systems that may introduce minor drag losses and missile corrective maneuvers that can bleed rocket motor energy, reducing range and making seeker acquisition more difficult. By manufacturing the integral dome/nozzle of the present teachings from a single mold, alignment tolerances are defined by the mold tolerances, which can be extremely tight given this is defined by the drawing machine tolerance requirements (which can typically be controlled to tenths of one thousandths). Conventional nozzle and dome assemblies typically result in tolerances an order of magnitude greater.

Thus, the present invention has been described herein with reference to a particular embodiment for a particular application. Those having ordinary skill in the art and access to the present teachings will recognize additional modifications, applications and embodiments within the scope thereof.

It is therefore intended by the appended claims to cover any and all such applications, modifications and embodiments within the scope of the present invention.

Accordingly,

What is claimed is:

1. A rocket motor comprising:
   a first layer of a first reinforcement material comprising graphite fibers to provide structural support;
   a second layer of a second reinforcement material comprising glass or quartz fibers to provide thermal insulation on a first side of the first layer;
   a third layer of a third reinforcement material comprising glass or quartz fibers to provide thermal insulation on a second side of the first layer; and
   a common matrix material surrounding said first, second and third reinforcement materials, wherein the first, second and third layers and the common matrix material form a single composite rocket motor dome and nozzle structure which is integral with the rocket motor.

2. The rocket motor of claim 1 wherein the composite dome and nozzle structure includes a narrow throat section between a dome section and a nozzle section of the integrated rocket motor dome and nozzle structure.

3. The rocket motor of claim 2 wherein the narrow throat section is devoid of the second layer and is configured to accept a throat insert comprising a carbon-carbon material to be positioned in contact with the first layer in the throat section.

4. The rocket motor of claim 3 wherein said matrix material is a high temperature resin.

5. The rocket motor of claim 4 wherein said matrix material is bismaleimide.

6. The rocket motor of claim 3 wherein said matrix material is cyanate ester.

7. The rocket motor of claim 3 wherein said matrix material is polyimide.

8. The rocket motor of claim 5 wherein said first reinforcement material is initially shaped to form an integrated dome and nozzle structure.

9. A rocket motor dome and nozzle structure comprising:
   a first layer of a first reinforcement material comprising graphite fibers for providing structural support shaped to form an integrated dome and nozzle;
   a second layer of a second reinforcement material comprising glass or quartz fibers to provide thermal insulation on a first side of the first layer; and
   a matrix material surrounding said first and said second reinforcement materials such that said first and second reinforcement materials and the matrix material form a single composite structure which is integral with a rocket motor.

10. The rocket motor dome and nozzle structure of claim 9 wherein said structure further includes a third layer of a third reinforcement material comprising glass or quartz fibers for providing thermal insulation on a second side of said first layer.

11. The rocket motor dome and nozzle structure of claim 10 wherein said matrix material surrounds said first, second, and third reinforcement materials such that said first, second, and third reinforcement materials and matrix material form a single integral component.

12. A method for fabricating a composite dome and nozzle structure of a rocket motor nozzle comprising:
    forming an integrated dome and nozzle structure from a first layer of a first reinforcement material comprising graphite fibers to provide structural support;
    adding a second layer of a second reinforcement material to a first side of said first layer, the second reinforcement material comprising glass or quartz fibers to provide thermal insulation on the first side of the first layer;
    surrounding said first and second reinforcement materials with a common matrix material; and
    curing said matrix material such that said first and second reinforcement materials and matrix material form a single composite structure comprising the composite dome and nozzle structure which is integral with a rocket motor,
    wherein the structure includes a narrow throat section between a dome section and a nozzle section of the integrated rocket motor dome and nozzle structure, and
    wherein the adding the second layer comprises refraining from adding the second layer to the narrow throat section.

13. The method of claim 12 wherein the narrow throat section is configured to accept a throat insert comprising a carbon-carbon material to be positioned in contact with the first layer in the throat section.

14. The rocket motor of claim 1 further comprising:
    a combustion chamber; and
    an igniter capable of igniting propellant contained in the combustion chamber.

15. The rocket motor dome and nozzle structure of claim 9 wherein the dome and nozzle structure includes a narrow throat section between a dome section and a nozzle section, wherein the narrow throat section is devoid of the second layer and is configured to accept a throat insert comprising a carbon-carbon material positioned to be in contact with the first layer in the narrow throat section.

16. A missile comprising:
    a missile body; and
    a rocket motor contained within the missile body and integral with a single composite dome and nozzle structure, the single composite dome and nozzle structure comprising
        a first layer of a first reinforcement material comprising graphite fibers to provide structural support;
        a second layer of a second reinforcement material comprising glass or quartz fibers to provide thermal insulation on a first side of the first layer;
        a third layer of a third reinforcement material comprising glass or quartz fibers to provide thermal insulation on a second side of the first layer; and
        a common matrix material surrounding said first, second and third reinforcement materials, wherein the first, second and third layers and the common matrix material form the single composite dome and nozzle structure.

17. The missile of claim 16 wherein the rocket motor further comprises a combustion chamber and an igniter capable of igniting propellant contained in the combustion chamber.

18. The missile of claim 16 wherein the missile further comprises a guidance system to control the igniter.

* * * * *